United States Patent
Gupta et al.

(10) Patent No.: US 7,216,093 B1
(45) Date of Patent: May 8, 2007

(54) METHOD OF, APPARATUS FOR, AND COMPUTER PROGRAM PRODUCT FOR TRADING GOODS

(75) Inventors: Deepak Gupta, New Delhi (IN); Manoj Kumar Kejriwal, Gaziabad (IN); Sandeep Deo, Ahmedabad (IN)

(73) Assignee: International Business Machines Corporation, Armonk, NY (US)

( * ) Notice: Subject to any disclaimer, the term of this patent is extended or adjusted under 35 U.S.C. 154(b) by 1561 days.

(21) Appl. No.: 09/649,679

(22) Filed: Aug. 28, 2000

(51) Int. Cl.
*G06Q 30/00* (2006.01)
*G06F 17/30* (2006.01)

(52) U.S. Cl. .......................................... 705/26; 705/27

(58) Field of Classification Search ................. 705/26, 705/37, 27
See application file for complete search history.

(56) References Cited

U.S. PATENT DOCUMENTS

| | | | |
|---|---|---|---|
| 6,574,608 B1 * | 6/2003 | Dahod et al. ................. | 705/26 |
| 2001/0049634 A1 * | 12/2001 | Stewart ....................... | 705/26 |
| 2002/0069156 A1 * | 6/2002 | Adam et al. ................. | 705/37 |
| 2002/0095368 A1 * | 7/2002 | Tran ............................ | 705/37 |

FOREIGN PATENT DOCUMENTS

JP 2002063444 * 2/2002

OTHER PUBLICATIONS

"The Customer Service Process," Business Line, Jul. 16, 1998.*

* cited by examiner

*Primary Examiner*—Matthew S. Gart
(74) *Attorney, Agent, or Firm*—Anthony V.S. England; William Steinberg

(57) ABSTRACT

A method, an apparatus, and a computer program product are disclosed for trading goods, or services, or both, using an electronic network. In the method, two or more entities are registered as traders. An entity is preferably a natural business, a legal entity, or a business. In turn, one or more business profile are generated for each of the traders. Further, one or more business opportunities are generated for one of the traders. The business opportunity or the at least one business profile of the one trader is compared with the business profiles of the remaining traders. One or more of the remaining traders are notified via the electronic network of a trading opportunity if the at least one business opportunity or the at least one profile matches the at least one business profile corresponding to one or more of the remaining traders.

36 Claims, 6 Drawing Sheets

Customise Business Opportunity

| | | |
|---|---|---|
| Identifier | size | Less than 14 characters |
| Label | Size of the Pr | |
| Type | Date ▽ | |
| Maximum length | 100 | Less than 2700, valid only for Strings |
| To be searched | ☐ | |

[Reset] [Next] [Finish]

FIG. 3

Customise Trader Profile

| | | |
|---|---|---|
| Identifier | size | Less than 14 characters |
| Label | Size of the Pr | |
| Type | Decimal ▽ | |
| Maximum length | 100 | Less than 2700, valid only for Strings |
| To be Matched with | Category Type | |

⦿ Greater  ○ Equal  ○ Less to be searched ☑

[Reset] [Next] [Finish]

FIG. 4

Customise Trade Profile - Step 2

Number of Keywords: 3

To be Matched with: Title Description

○ Equal  ● Less

[Reset] [Finish]

FIG. 5

Search Business Opportunites

Search: Computers
Type: Sell
Category: Category 3
Posted Since: 03 Feb 2000

[Reset] [Search]

FIG. 6

Search Business Profiles

Search: ISP
Type: All
Category: Category 1

[Reset] [Search]

FIG. 7

METHOD OF, APPARATUS FOR, AND COMPUTER PROGRAM PRODUCT FOR TRADING GOODS

FIELD OF THE INVENTION

The present invention relates generally to electronic business (e-business) and in particular to business-to-business electronic commerce (e-commerce) via computer networks.

BACKGROUND

Numerous entities including individuals, companies and other forms of businesses are interested in a Business to Business (B2B) site where the members are able to find trading partners from all over the world for trading goods and services.

An existing Net Commerce product produced by IBM offers 3 types of stores, namely One Stop Shop, Personal Delivery and Business to Business Store. One Stop Shop is a simple business to consumer store model that does not require shoppers to register. Personal Delivery is a business to consumer store model that offers more store functions including Registration and Address Books. Business to Business is a B2B store model that includes an approval process for purchases. All three types of stores, however, assume that a merchant is selling products to consumers visiting their store (be it Casual Shoppers as in One Stop Shop, Registered Shoppers as in Personal Delivery, or office managers as in Business to Business Shop). The product was called Net.Commerce Start and Pro Editions, v3.x earlier, until v3.2. The product is currently referred to as WebSphere Commerce Suite Start and Pro Editions, Version 4.1.

The Net Commerce product provided by IBM has a number of features:

1. Helps build compelling e-commerce sites that allow customers to shop the way the customers want to: set preferences, navigate personal catalogs, drop items in shopping carts, check out, select payment and shipping methods and pay for purchases by credit card;
2. Helps the site administrator to easily manage stores or malls through a administrative interface that controls security using user Ids and password protection and lets the site administrator monitor buyer behavior to plan for future site enhancements;
3. Helps create interactive catalogs that contain marketing and technical information to help guide customers through the buying process, leading them to the products the customers want to purchase; and
4. Accept and process those Credit Card Payments.

In Net.Commerce, the key concept is that something is sold. The sellable thing is known as a product. The user buys and pays for a product. However the trading network itself does not sell any product. Rather the trading network helps party A know that party B is selling a relevant product. If a party is interested in buying the product, the party can contact party B. The contact with party B and the negotiations happen outside the system. Hence, this system does not sell products.

Instead, the NetCommerce product broadcasts appropriate opportunities (to buy/sell products) to appropriate people. Hence party A posts an opportunity that the party is interested in selling something. Party B states an interest in buying something. The system helps in alerting party B that party A might meet party B's demands, but party B does not buy products through the system. Party B has to contact party A offline for buying this.

Thus, a need clearly exists for a trading system permitting any registered shopper to enter a product (read opportunity) and not only the administrator.

SUMMARY

In accordance with a first aspect of the invention, there is provided a method of trading goods, or services, or both, using an electronic network. The method includes the steps of:

registering two or more entities as traders;

generating at least one business profile for each of the traders;

generating at least one business opportunity for one of the traders;

comparing the at least one business opportunity or the at least one business profile of the one trader with the business profiles of the remaining traders; and notifying via the electronic network one or more of the remaining traders of a trading opportunity if the at least one business opportunity or the at least one profile matches the at least one business profile corresponding to one or more of the remaining traders.

Preferably, each entity is selected from the group consisting of a natural person, a legal entity and a business.

The notifying step preferably involves sending an email message to each of the one or more remaining traders having matching profiles.

Preferably, the method includes the step of creating a trading shop communicable with each of the traders via the electronic network, the trading shop being a repository of the business profiles and the at least one business opportunity. Optionally, the creating step includes the steps of: specifying attributes of a business profile for the trading shop; specifying attributes of a business opportunity for the trading shop; and creating tables with the specified attributes. Still further, the creating step may include the step of customising workflow of the trading shop.

Preferably, trading includes:

buying goods, a service, or both; and selling goods, a service, or both.

Preferably, the method includes the step of requesting payment from the trader during registration of the trader, creation of a business profile for the trader, or posting of a business opportunity by the trader.

Preferably, the method includes the step of searching by one of the traders for at least one business opportunity or at least one profile matching a specified business profile.

Preferably, the method includes the step of providing a database containing the at least one business opportunity and the business profiles.

Preferably, a business profile specifies information about a trader and contains a plurality of attributes for storing information pertinent to a trader. More preferably, the business opportunity is a notification of an opportunity to buy, sell, or both, one or more of goods and services and contains a plurality of attributes for storing information pertinent to the opportunity.

In accordance with a second aspect of the invention, there is provided an apparatus for trading goods, or services, or both, using an electronic network. The apparatus include:

a device for registering two or more entities as traders;

a device for generating at least one business profile for each of the traders;

a device for generating at least one business opportunity for one of the traders;

a device for comparing the at least one business opportunity or the at least one business profile of the one trader with the business profiles of the remaining traders; and a device for notifying via the electronic network one or more of the remaining traders of a trading opportunity if the at least one business opportunity or the at least one profile matches the at least one business profile corresponding to one or more of the remaining traders.

In accordance with a third aspect of the invention, there is provided a computer program product having a computer readable medium having a computer program recorded therein for trading goods, or services, or both, using an electronic network. The computer program product includes:

a computer program code module for registering two or more entities as traders;

a computer program code module for generating at least one business profile for each of the traders;

a computer program code module for generating at least one business opportunity for one of the traders;

a computer program code module for comparing the at least one business opportunity or the at least one business profile of the one trader with the business profiles of the remaining traders; and a computer program code module for notifying via the electronic network one or more of the remaining traders of a trading opportunity if the at least one business opportunity or the at least one profile matches the at least one business profile corresponding to one or more of the remaining traders.

BRIEF DESCRIPTION OF THE DRAWINGS

Embodiments of the invention are described hereinafter with reference to the drawings, in which:

FIG. 3 is a screen shot of the Create Opportunity Table Page according to the first embodiment of the invention.

FIG. 4 is a screen shot of a Create Business Profile Step One Page of the first embodiment;

FIG. 5 is a screen shot of the Create Business Profile Step Two Page of the first embodiment of the invention;

FIG. 6 is a screen shot of the Search Opportunity Sample Form according to the first embodiment of the invention;

FIG. 7 is a screen shot of the Search Profile Sample Form of the first embodiment of the invention;

DETAILED DESCRIPTION

Figure 1:
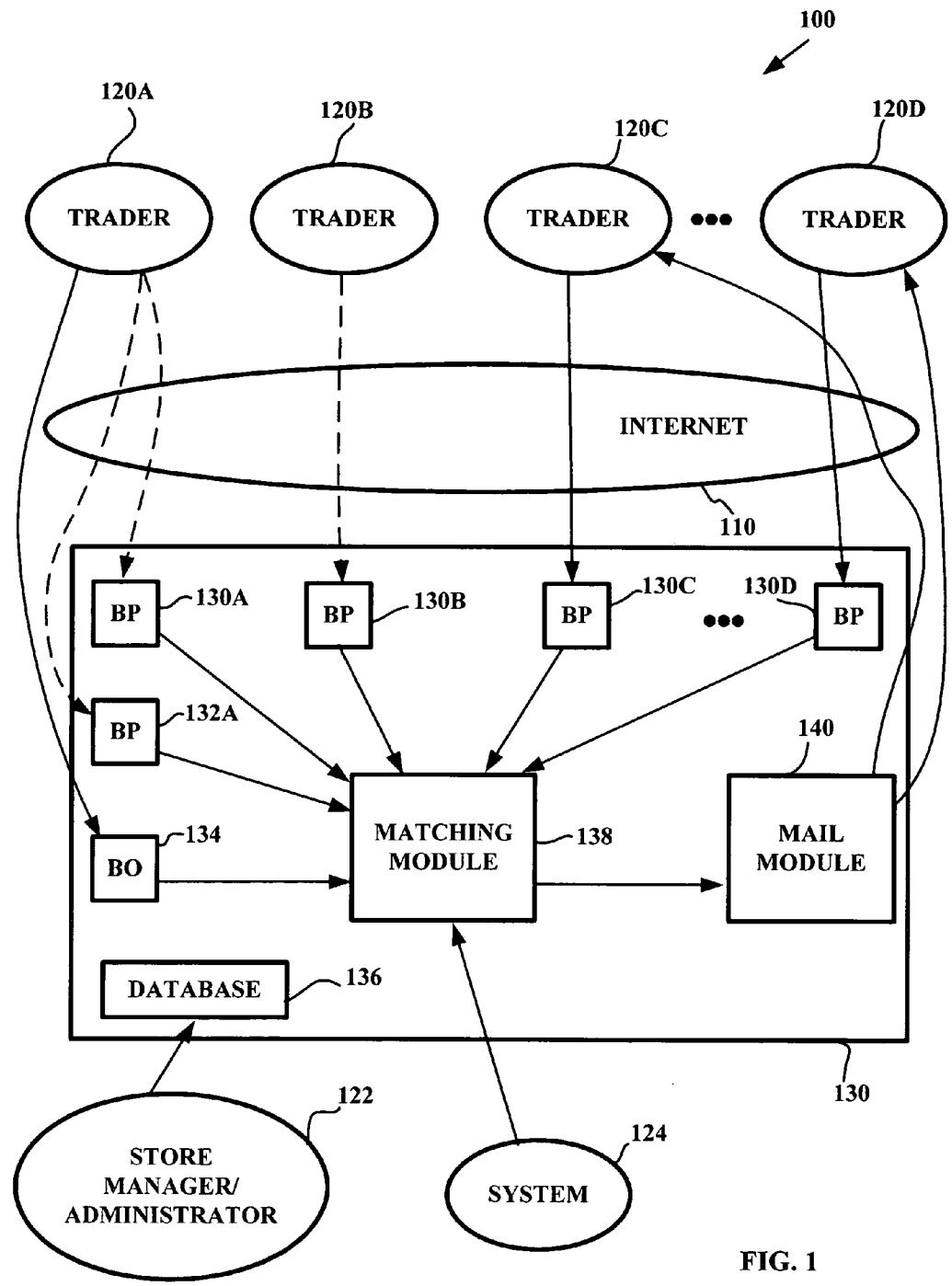
FIG. 1 is a block diagram illustrating the trading network store in accordance with the embodiments of the invention.

A method, an apparatus, and a computer program product are disclosed for trading goods, or services, or both, using an electronic network. The embodiments of the invention utilise a business model (i.e. a trading network store) for sites of an electronic network to trade in such goods and/or services. In the following description, numerous details are set forth. It will be apparent to one skilled in the art, however, that the present invention may be practised without these specific details. In other instances, well-known features are not described in detail so as not to obscure the present invention.

In the following description, components of the trading network store are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

A glossary follows to define terminology used hereinafter.

| | |
|---|---|
| CCB: | Stands for Credit Card Bank, the bank that evaluates and commits the Credit Card transaction. |
| Web Browser: | Software used to obtain, view and read information that is posted in the HyperText Markup Language. Simply referred to as a browser. |
| Database Record: | A logical collection of data. |
| Database Table: | A logical collection of records in a tabular form. |
| E-Mail Client: | Software used to receive and read electronic Mails. |
| HTML: | HyperText Markup Language. |
| HTTP: | HyperText Transfer Protocol. |
| HTTPS: | HyperText Transport Protocol Secure. |
| KEYGEN: | A HTML tag introduced by Netscape, which instructs the Browser viewing the particular page, to generate a public-private key pair, store the private key under a password, and send the public key to the Web Server hosting the page. |
| MACRO: | Net.Data code that retrieves information from the database and generates dynamic HTML pages. |
| Net.Data: | Software that interfaces a database to a Web Server. |
| SMTP Server: | Simple Mail Transfer Protocol Server is used to send Electronic Mail. |
| SMTP: | Simple Mail Transfer Protocol. |
| SSL: | Secure Socket Layer. |
| URL: | Uniform Resource Locator. In colloquial terms, it is usually referred to as a LINK. |
| Web Page: | A page written in HTML, and posted on the Internet on a Web Server. |
| Web Server: | A Server used to post data on the Internet using the HyperText Transfer Protocol. |

The detailed description is organised as follows:
1. Brief Overview
2. Roles
3. System Entities
4. Activities on the Store
5. Database Design
6. Web Pages
7. Daemons in the System
8. Matching Algorithms
9. Emails
10. Case Studies
11. Computer Implementation The trading network store according to the embodiments of the invention is designed for on-line brokerage and trading of goods and services through the Internet or other suitable electronic network (e.g. an Intranet or an Extranet). Again, many potential customers are interested in a Business to Business site where the members are able to find trading partners from all over the world for the goods and services the customers wish to trade in. The embodiments provide a trading network store that can be easily customised to meet the requirements of customers. IBM's Net Commerce product provides similar functionality for a Store/Mall kind of an environment. The embodiments of the invention integrate this with the existing Net Commerce Product so as to synergise the strengths of Net Commerce and the proposed model.

Opportunities cannot be mapped to products of NetCommerce because attributes need to be defined as columns and not as rows as is the case with the NetCommerce system. Product Advisor does the same thing. However, that needs to be resynchronized whenever a new product is added. In the embodiments of the invention, the opportunities keep on getting added and hence trading network store cannot wait till resynchronization.

1. Brief Overview

The Trading Network Store according to the embodiments of the invention is a site where registered entities list what the entities are interested in and post "Business Opportunities" when the entities have an immediate business requirement. An entity can be a natural person or individual, a legal entity such as a body corporate (e.g. a company), or some other form of business. A Business Opportunity is, simply put, an advertisement on the Internet, or more simply the Net, in the event of a trader having an immediate requirement to buy/sell things. The target registered shoppers or entities are Traders interested in doing business (as in a typical Business to Business scenario) and not general shoppers. The main feature of the trading network store is to automatically match up the interests of the Traders with those of other traders and with the Business Opportunities posted by Traders. In normal operation, entities register with the site and specify what the entities are interested in. The system automatically matches these Traders with the profiles of the Traders already registered. Traders are then able to post Business Opportunities. The system automatically matches the business opportunities with the profiles of the Traders registered and sends an email message to the respective traders that a prospective trade is waiting for those traders.

FIG. 1 is a block diagram illustrating a trading network store 100 in accordance with the embodiments of the invention. A central site 130 serves as the trading network store. Coupled to the central site 130 via the Internet 110, or other appropriate electronic network, are a number of traders 120A–120D. Also there is a store manager/administrator 122 and a system 124 coupled to the central site 130. Each of the traders 120A–120D has a corresponding business profile 130A–130D and 132A. For example, the trader 120A has two business profiles 130A, 132A. The second trader 120B only has one business profile 130B. Other numbers of business profiles can be practiced without departing from the scope and spirit of the invention. The relationship between the trader 120A–120D and the corresponding business profile(s) 130A–130D, 132A is indicated by dashed arrows. Further, each of the traders 120A–120D can post one or more business opportunities with the central site 130.

In FIG. 1, a single business opportunity 134 is posted by the registered trader 120A. A matching module of 138 of the central site 130 is used to compare business profiles 130A–130D, 132A and/or business opportunities (e.g., 134). The system 124 is used to operate and control the matching module 138. The matching module 138 then causes the mail module 140 to notify by email any registered traders 120A–120D of business opportunities and/or business profiles that they may be interested in. For example, the mail module 140 may notify the registered trader 120D of the new business opportunity 134 after the matching module 138 compares and matches the business opportunity 134 with the business profile 130D of the trader 120D. The central site 130 also has a database 136 containing customised aspects of the trading network store including default business opportunity, object settings and default business profile object settings.

Figure 2:
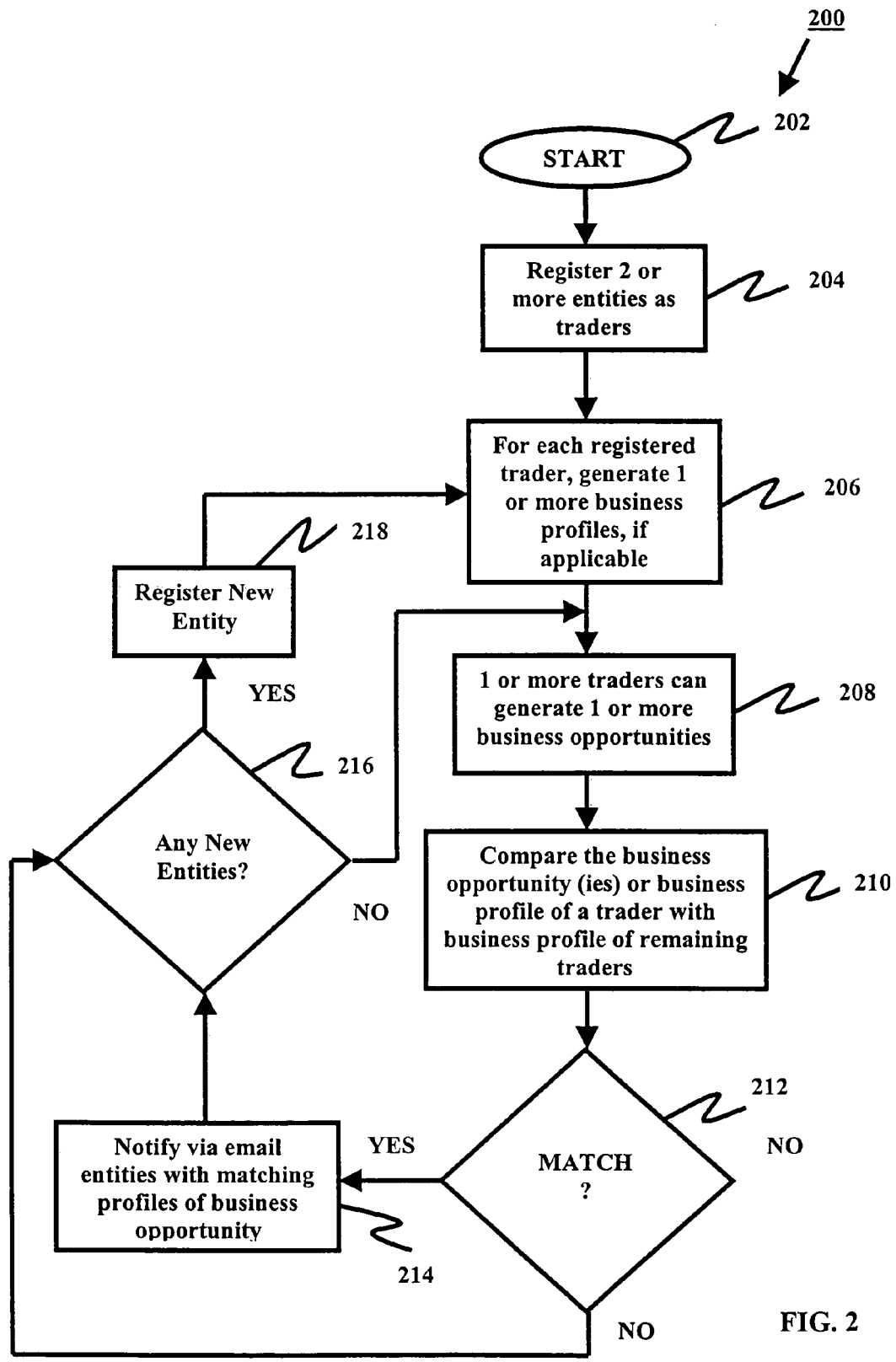
FIG. 2 is a flow diagram illustrating operation of the trading network store in accordance with the first embodiment of the invention.

FIG. 2 is a flow diagram illustrating the process 200 of operating the trading network store in accordance with a first embodiment of the invention. Processing commences at step 202. In step 204 two or more entities are registered as traders. In step 206, for each registered trader, one or more business profiles are generated, if applicable. In step 208, one or more of the registered traders can generate one or more business opportunities, which are posted to the central site. In step 210, the business opportunity (ies) or business profile(s) of a trader is compared with the business profiles of remaining traders.

In decision block 212, a check is made to determine if there is a match between the business opportunity and one or more of the business profiles, or a match between two or more business profiles. If decision block 212 returns false (no), processing continues at decision block 216. Otherwise, if decision block 212 returns true (yes), processing continues at step 214. In step 214, entities with matching profiles are notified via email. Processing then continues at decision block 216.

In decision block 216, a check is made to determine if there are any new entities. If decision block 216 returns false (no), processing continues at step 208. Otherwise, if decision block 216 returns true (yes), processing continues at step 218. In step 218 a new entity is registered. Processing then continues at step 206.

As the aim of the embodiments of the invention is to add a Trading Network store to the current Net Commerce product (or Websphere Commerce Suite), common features of Net Commerce including Access Control, Security, Logon, Payment, etc. are available by default in this store also. A key difference between a NetCommerce store and the trading network store is that all the registered traders 120A–120D can upload products (read opportunities) into the trading network store according to the embodiments of the invention. Hence the job of the administrator 122 is simply to create an empty store and define the attributes of the opportunities the registered shoppers are going to create. In other words the job of the Store Creator is to define opportunities and business profiles and the registered traders fill in values in corresponding tables, preferably using HTML forms.

2. Roles

Broadly, the trading network store 100 has three types of users who have different roles, namely the Store Manager or Administrator 122, traders 120A–120D, and the system 124. Each of these users is described in greater detail hereinafter.

2.1 Store Manager/Administrator

The Store Manager 122 is responsible for creating and managing the store 100. The Store Manager 122 assigns attributes to Business-Opportunity and Business-Profile Objects and defines the searchable fields in those objects via the database 136. The Manager 122 also customises the store 100 to desired requirements in terms of selecting templates, shipping methods, payments, etc. Finally the Store Manager 122 is responsible for all the administrative tasks of the Store 100.

2.2 Trader—Buyer, Seller

Traders 120A–120D are the store's end users, who register with the trading network store and create Business Profiles 130A–130D, 132A. Each trader can have as many Business Profiles 130A–130D, 132A as desired. A Business Profile is a mechanism of indicating to the system the type and kind of Business the trader is interested in. The traders 120A–120D also post on the site Business Opportunities 134, which are immediate Business requirements of the trader to Buy/Sell a product and/or service. A Business Opportunity 134 can be thought of as an advertisement of immediate business also. Traders 120A–120D are able to browse the Store and search for interesting Profiles/Opportunities that suit their business needs. Finally, traders 120A–120D are able to perform general operations like updating their address, contact information, etc.

2.3 System

The system 124 performs the general operations essential for the functioning of the Store and the Net Commerce system. Its role is similar to the one played in the current Net Commerce product. The system 124 runs various daemons and controllers to perform various jobs. The system matches profiles with an opportunity and stores the matching profiles.

3. System Entities

Information about system entities is maintained and stored by the site 130. The system entities include demographics, a business opportunity, a business profile, and mail. Each is described in greater detail hereinafter.

3.1 Demographics

Demographics are related to Traders in the system, and include attributes and functionality of an entity.

3.1.1 Attributes of this Entity:

All the attributes of Demographics can be combined into three categories:

Address:
  Contact Name, Contact Title, Address1, Address2, Address3, Street, City, State, Zip, Country, Fax, Phone, Mobile, Email, URL, Field1, Field2.

Company:
  Name, Description, Industry, Annual Turn Over, Workforce, Year Established.

Login Information:
  Login Id, Password, Challenge Question, Challenge Answer.

3.1.2 Functionality Performed on this Entity

The following functionality can be performed by different roles:

Trader:
  Create/Modify

Administrator:
  Delete

System:
  None

3.2 Business Opportunity

3.2.1 Attributes of this Entity

Title, Type (Buyer/Seller), Classification, Date of Post, Date of Expire, Hits, Enquiries received, Enquiries Sent. Additional Attributes can be assigned by the Store Administrator.

3.2.2 Functionality Performed on this Entity

The following functionality can be performed on this entity:

Buyer/Seller
  Post, View, Search, and Delete.

Administrator
  View, Delete.

System
  None.

3.3 Business Profile

3.3.1 Attributes of this Entity

Name, Type, Classification, Keywords. The Store Administrator 122 can define additional Attributes.

3.3.2 Functionality Performed on this Entity

Buyer/Seller
  Create, View, Modify and Delete.

Administrator
  None.

System
  None.

3.4 Mail

3.4.1 Attributes of this Entity

To, from, Subject and message.

3.4.2 Functionality Performed on this Entity

System
  Dispatches mails when a new opportunity/profile is created using the matching criterion specified.

4. Activities on the Store

4.1 Store Creation

Store Creation is a one-time activity performed by the Store Creator 122. All the database tables, necessary HTML pages, images and macros are created at this time.

The Store Creation involves the following steps apart from the basic steps followed for every store in Net Commerce namely Store Model, Contact Information, Sample Data & Description, Payment Methods, Store Style, Page Layouts, Create or Update.

1. Enter Opportunity Attributes
   (see the screenshot 300 of FIG. 3)
2. Enter Business Profile Attributes
   (see the screenshots 400 and 500 of FIGS. 4 and 5)
3. Based on the above information the StoreCreator creates tables with as many attributes as defined in the above steps.

CreateOpp.htm

The form 300 of FIG. 3 enables the Store Administrator 122 to specify the additional attributes for Business Opportunities 134. For each Attribute, the Store Administrator 122 specifies the following fields give in form 300:

1. The Identifier: This is appended to opp_and used as the column name in the Opportunity Table (for example, opp_size) opp_is a prefix added to every attribute. In the Database, to distinguish which column belongs to which table, a prefix is generally associated with every table. For example all column names for an opportunity table start with opp_, all column names for country table start with con_, etc. This is just a convention used for simplicity and clarity. Opp_size is an example on the above. If the user of our systems enters size as an attribute, opp_is appended to size to make opp_size, which becomes a column of the table then.
2. The Name or Label of the Attribute: This is stored in the Attribute_Name table and is used only for display purposes in the HTML pages.
3. Type of Attribute: String, Integer, Date or Decimal.
4. Maximum Length: This is an optional field (mandatory if string selected in type) and specifies the max length of the string attribute. The maximum length in a DB2 database can be 2700 so the user cannot enter more than 2700 here.
5. To be Searched Box: This field, if checked is searched in the Keywords in the Search Pages of the Store.
6. Clicking on the Next button saves the entered information and proceeds to the next attribute. Clicking on Finish saves this attribute and exits from CreateOpp.htm to the next step of Store Creation.

When the User clicks on Next, the script for creation of an Opportunity is appended with the corresponding entry for the attribute, and a row is created in the Attribute_name table. When the user clicks on Finish, the Opportunity Table creation script is terminated and the table is created.

CreateProfile.htm

The form 400 of FIG. 4 enables the Store Administrator to specify the additional attributes for a Business Profile. For each Attribute, the store administrator specifies:
1. The Identifier: This is appended to opp_and used as the column name in the Opportunity Table (for example opp_size).
2. The Label of the Attribute: This is stored in the Attribute_Name table and is used only for display purposes in the HTML pages.
3. Type of Attribute: String, Integer, Date or Decimal.
4. Maximum Length: This is optional field (mandatory if string selected in type) and specifies the maximum length of the string attribute. The maximum length in DB2 database can be 2700 so the user cannot enter more than 2700 here.
5. To be Matched Box: Checkbox indicating if this attribute is only for display purposes or has to be used during the matching of this profile with Business Opportunities. If this is to be matched then the field(s) the profile has to be matched against should be indicated. The radio buttons are for the type of matching to be done. For Decimal, Integer and Date types of attributes, Greater, Less and Equal have their implied meanings, for String Attribute Less than means search for if the provided word is a substring, equal means an exact match, Greater is irrelevant. For example, For String Attribute in the Profile, the Administrator selects Less, then the profile Car is searched for all Opportunities where the three characters "car" occur in sequence in the respective fields, so all opportunities with words car, cars, cardboards, etc. are searched. However if equal is mentioned then only opportunities with the exact phrase "car" are searched and cardboard opportunities are ignored.
6. Clicking on the Next button saves the current attribute and proceeds to the next attribute. Clicking on the Finish button saves this attribute and exits from this step. When the User clicks on the Next button, the script for creation of BusinessProfile Table is appended with the corresponding entry for the attribute. A row is also created in the Attribute_name table. When the user clicks on the Finish button, the BusinessProfile Table creation script is terminated and the table is created.

CreateProfile2.htm

The form 500 of FIG. 5 enables the Store Administrator 122 to specify the keyword attribute for Business Profile. The Store Administrator needs to specify:
1. Number of keywords: The number of keywords in one profile. These are strings used to search in Opportunity Database.
2. To be matched With field indicates the fields in the Opportunity Database against which the keywords are matched.
3. The radio buttons have the same implications as in CreateProfile.htm 400.

On clicking the Finish button, the Store is created. Apart from the functions carried out by Net Commerce for creation of any Store the following are done:

The tables Opportunity and Business Profile are created. Please note that the other Database Tables are created at the time of Net Commerce Installation.

Country, Zone, Zone_Country and TradeRoles Table are populated with the default scripts. These can be changed by using DB2 utilities.

TraderKeywordDetails, MatchRelation, Attribute_Name and TraderKeywordMatch Tables are populated.

4.2 Store Customization

This is done before any other activity begins on the store. The Administrator 122 is allowed to customise the workflow. The Administrator 122 may want to plug in a Payments module or functionality at various points and determine business rules for various other activities. For these, the Administrator 122 either may have to customise the Net Commerce commands, tasks and overridable functions (Ofs) available or may wish to write some. This is similar to the current Net Commerce product implementation.

4.3 Registration of Traders

Once the store is ready for business, Traders 120A–120D can come and register for trading on the Store. This module is the same as in Net Commerce Personal Delivery/Business To Business Store. People get a UserId, Password and on Logging in get a Personalised Home Page. The Home Page displays their Matching Profiles.

4.4 Creation of Business Profiles

Registered Traders 120A–120D are allowed to create Business Profiles 130A–130D, 132A. Each Trader 120A–120D can create as many Profiles as the party wants. The Trader pulls out a form and enters the attributes of the Profile. As soon as the profile is created, a command is run which matches the profile with all the Opportunities posted before the last time a Business Opportunity Alert Daemon was run and with all the profiles created before the last time a Business Profile Alert Daemon was run. The two foregoing daemons are described in greater detail hereinafter. Both the Opp_Profile and Profile_Profile Tables are then updated. These tables are used to store the matching Profiles and Opportunities of a particular Trader. The daemons match the interests of the trader with profiles and opportunities in the database of other traders and stores this information in the tables. Profile_Profile table stores the matching profiles and Opp_Profile stores the matching opportunities for the trader.

4.5 Creation of Business Opportunities

Traders 120A–120D create Business Opportunities 134 when the Traders have immediate need to buy/sell goods or services. The Traders pull out a form and enter the attributes of the Opportunity.

4.6 Matching of Business Profiles

Matching is done by two background daemons at the end of each day. The first daemon matches the profiles of the newly registered traders posted during the day with the profiles of other existing traders. The second daemon expires all Traders due to expire that day or before. Both the daemons update the Profile_Profile Table. Details of the Daemons are given hereinafter.

4.7 Matching of Business Profiles with Business Opportunities

Matching is done by two background daemons at the end of each day. The first daemon matches all the Opportunities posted during the day with the profiles of traders. The second daemon expires all Opportunities due to expire that day or before. Both daemons update the Opp_Profile Table. Details of the Daemons are given hereinafter.

4.8 Search Opportunity Database

Apart from viewing their Matching Opportunities, Traders 120A–120D can search the Opportunity Database (forming part of the database 136) as well. The Traders 120A–120D specify the attributes on which a search is performed. The fields on which the Keyword is to be searched are customizable by the Store Administrator 122.

4.9 Search Company Database

Apart from viewing their matching Profiles, Traders 120A–120D can search the Company Database (forming part of the database module 136) as well. The Traders 120A–120D specify the attributes on which the search is performed.

4.10 Payment

This is similar to the current Net Commerce implementation. The user of a site must be able to make payment for the services the user receives or the products the user buys. By default, Net Commerce comes with a payment module called "eTill", which integrates seamlessly with the IBM Payment Gateway and helps in the Credit Card Processing. However there is also available third party software like ICVerify with which Net.Commerce can be integrated. Numerous Payment products can be chosen, and numerous modes in which Payments can be accepted (credit card, debit card etc) are available. More important is when the payments are accepted in the full flow. This depends upon the merchant or the site owner. Payments can be accepted any time when the user registers or when the user creates profile or when the user posts an opportunity. There is no hard and fast rule for that. The modes listed hereinbefore are just the guidelines.

5. Database Design

This section describes each table (apart from the standard Net Commerce Tables currently available) in the database along with the attributes. The Store Administrator 122 has an entry in the Merchant Table and all Traders in the Shopper Table.

5.1 General Tables

The new tables required for the Trading Network Store 100 are described hereinafter. The Store 100 also uses the default Net Commerce tables available in the current product. Most Master tables (Opportunity, Business Profile etc) have a reference number as the primary key of the table. This is a running number, which uses the same mechanism for generation as used by Net Commerce for Shopper and Merchant Reference Numbers.

5.1.1 Table Name: Opportunity Table

An OpportunityTable is a dynamic table created after the Store Creator 122 defines the attributes to the Opportunity. Table 1 shows the columns in the OpportunityTable. Additional fields are added to the table at the time of customising the store (by specifying attributes to the Opportunity by the user) and the table is created.

TABLE 1

| S. No. | Field Name | Data Type | Mandatory | Description |
|---|---|---|---|---|
| 1. | Opp_id | INTEGER | Y | Opportunity Reference No |
| 2. | Opp_title | CHAR(50) | Y | Opportunity Title |
| 3. | Opp_type | INTEGER | Y | Buy/Sell |
| 4. | Opp_Category | INTEGER | Y | Category of Opportunity |
| 5. | Opp_Mr_rf_no | INTEGER | Y | Merchant Reference No |
| 6. | Opp_Shopper_no | INTEGER | Y | Shopper Reference No, Who posted the Opportunity |
| 7. | Opp_date_post | DATE | Y | Date of Posting of the Opportunity |
| 8. | Opp_status | CHAR(1) | Y | A: Active, P: Pending, S: Suspended, D: Deleted, E: Expired |
| 9. | Opp_price | DECIMAL | N | Price of the Opportunity |
| 10. | Opp_currency | INTEGER | N | Currency of Opportunity |
| 11. | Opp_Hits | INTEGER | Y | No of hits on the Opportunity |
| 12. | Opp_Enq_Sent | INTEGER | Y | No of enquiries sent for the Opportunity by the system i.e. No of users to which this opportunity was sent via the Opportunity Alert Daemon |
| 13. | Opp_Enq_Recd | INTEGER | Y | No of enquiries received for the Opportunity from users i.e. No of people who sent the Opportunity Owner mail through the Contact Company Page |
| 14. | Opp_email | VARCHAR(80) | N | Email, if different from Shopper's email |
| 15. | Opp_org_Country | CHAR(2) | N | Originating Country, if different from Shopper |
| 16. | Opp_target_mkt | CHAR(3) | N | Target Market of the Opportunity |
| 17. | Opp_Description | VARCHAR(2700) | Y | Description of the Opportunity |

Primary Key: Opp_no
Constraints: Opp_Category references Category Table, Opp_Mr_rf_no references the Merchant Table, Opp_Shopper_No references the Shopper Table, Opp_currency references the Currency Table, Opp_org_country references Country Table, opp_type references TraderRoles
Purpose: To store the Business Opportunities posted by Traders

5.1.2 Table Name: TradeRoles Table

Table 2 shows the Trade Roles Table.

TABLE 2

| S. No. | Field Name | Data Type | Mandatory | Description |
|---|---|---|---|---|
| 1. | trr_mr_rf_no | INTEGER | Y | Merchant Reference No |
| 2. | Trr_Code | INTEGER | Y | Role Reference No |
| 3. | Trr_Description | VARCHAR (25) | Y | Role Description |
| 4. | Trr_field1 | VARCHAR (10) | N | EXTRA FIELD |

Primary Key: Trr_Code
Constraints: Trr_mr_rf_no references the Merchant Table
Purpose: To store the different roles for a Trader (example Buyer/Seller)

5.1.3 Table Name: Country Table

Table 3 shows the Country Table.

TABLE 3

| S. No. | Field Name | I.Data Type | Mandatory | Description |
|---|---|---|---|---|
| 1. | Con_Code | CHAR(2) | Y | Country Code |
| 2. | Con_Name | VARCHAR(25) | Y | Country Name |

Primary Key: Cat_Code
Purpose: To store the list of countries.

5.1.4 Table Name: Zone Table

Table 4 shows the Zone Table.

TABLE 4

| S. No. | Field Name | Data Type | Mandatory | I.Description |
|---|---|---|---|---|
| 1. | Zon_Code | CHAR(3) | Y | Country Code |
| 2. | Zon_Name | VARCHAR(25) | Y | Country Name |

Primary Key: Zon_Code
Purpose: To store the list of zones.

5.1.5 Table Name: Zone_Country Table

Table 5 shows the Zone_Country Table.

TABLE 5

| S. No. | Field Name | Data Type | Mandatory | Description |
|---|---|---|---|---|
| 1. | Zc_zon_Code | CHAR(3) | Y | Zone Code |
| 2. | Zc_con_Code | CHAR(2) | Y | Country Code |

Primary Key: Zc_Con_code + Zc_zon_code
Constraints: Zc_zon_code references Zone Table, Zc_con_code references Country Table
Purpose: To store the zone-country relationships.

5.1.6 Table Name: Business Profile

A Business Profile Table shown in Table 6 is also a dynamic table, and more fields are added once the user customises the Business Profile while creating the store.

TABLE 6

| S. No. | Field Name | Data Type | Mandatory | Description |
|---|---|---|---|---|
| 1. | Prf_id | INTEGER | Y | Identification No |
| 2. | Prf_shopper_no | INTEGER | Y | Shopper Reference No |
| 3. | Prf_Mr_rf_no | INTEGER | Y | Merchant Reference No |

TABLE 6-continued

| S. No. | Field Name | Data Type | Mandatory | Description |
|---|---|---|---|---|
| 4. | Prf_Name | INTEGER | Y | Profile Name |
| 5. | Prf_Category | INTEGER | Y | Category of Profile |
| 6. | Prf_Type | INTEGER | Y | Type of profile (Buy/Sell) |

Primary Key: Prf_id
Constraints: Prf_mr_rf_no references the Merchant Table, Prf_Shopper_no references the Shopper Table
Purpose: To store the profiles of the Traders.

5.1.7 Table Name: TraderKeywordDetails

Table 7 shows the TraderKeywordDetails Table.

TABLE 7

| S. No. | Field Name | Data Type | Mandatory | Description |
|---|---|---|---|---|
| 1. | Tkd_mr_rf_no | INTEGER | Y | Merchant Reference No |
| 2. | Tkd_keywords | INTEGER | Y | No of Keywords |
| 3. | Tkd_type_match | CHAR(1) | Y | L: Less Than E: Equal To |

Primary Key: Tkd_mr_rf_no
Constraints: Tkd_mr_rf_no references the Merchant Table
Purpose: To store maximum number of keywords in the profile of any trader.

5.1.8 Table Name: TraderKeywordMatch

Table 8 shows the TraderKeywordMatch Table.

TABLE 8

| S. No. | Field Name | Data Type | Mandatory | Description |
|---|---|---|---|---|
| 1. | Tkm_mr_rf_no | INTEGER | Y | Merchant Reference No |
| 2. | Tkm_opp_fields | VARCHAR (18) | Y | Name of the field in the Opportunity Table. |

Primary Key: Tkd_mr_rf_no
Constraints: Tkd_mr_rf_no references the Merchant Table
Purpose: To store fields in Opportunity Table to be matched with the keywords in Business Profile.

5.1.9 Table Name: TraderKeywords Table

Table 9 shows the Trader Keywords Table.

TABLE 9

| S. No. | Field Name | Data Type | Mandatory | Description |
|---|---|---|---|---|
| 1. | Trk_mr_rf_no | INTEGER | Y | Merchant reference no |
| 2. | Trk_prf_id | INTEGER | Y | Profile Id for the Keyword |
| 3. | Trk_prf_keyword | VARCHAR(80) | Y | Keyword |
| 4. | Trk_prf_keyword | CHAR(1) | N | A: AND, O: OR, N: NOT |
| 5. | Trk_field1 | VARCHAR(50) | N | EXTRA FIELD |

Primary Key:
Constraints: Trk_prf_id references Business Profile Table
Purpose: To store the keywords associated with each profile of the Trader.

5.1.10 Table Name: Opp_Profile Table

Table 10 shows the Opp_Profile Table.

TABLE 10

| S. No. | Field Name | Data Type | Mandatory | Description |
|---|---|---|---|---|
| 1. | Opr_pr_id | INTEGER | Y | Profile id |
| 2. | Opr_opp_id | INTEGER | Y | Opportunity Id |

Primary Key: Opr_pr_id + Opr_opp_id
Constraints: Opr_pr_id references Business ProfileTable, Opr_opp_id references Opportunity Table
Purpose: To store the Opportunities matching a particular profile.

5.1.11 Table Name: Profile_Profile Table

Table 11 shows the Profile_Profile Table.

TABLE 11

| S. No. | Field Name | Data Type | Mandatory | Description |
|---|---|---|---|---|
| 1. | Ppr_pr_id1 | INTEGER | Y | Profile id |
| 2. | Ppr_pr_id2 | INTEGER | Y | Profile id |

Primary Key: Ppr_pr_id1 + Ppr_pr_id2
Constraints: Ppr_pr_id1, Ppr_pr_id2 references Business Profile.
Purpose: To store the profiles matching each other.

5.1.12 Table Name: MatchRelation Table

Table 12 shows the MatchRelation Table.

TABLE 12

| S. No. | Field Name | Data Type | Mandatory | I.Description |
|---|---|---|---|---|
| 1. | Mrl_mr_rf_no | INTEGER | Y | Merchant reference no |
| 2. | Mrl_opp_field | VARCHAR(18) | Y | Opportunity Table field. |
| 3. | Mrl_prf_field | VARCHAR(18) | Y | Profile Table field. |
| 4. | Mrl_typeof_match | CHAR(1) | Y | G: Greater Than L: Less Than E: Equal To |

Primary Key: Mrl_opp_field + Mrl_prf_field
Constraints: None.
Purpose: To store the fields of the Opportunity and Profile table to be matched. Mrl_typeof_match indicates type of matching to be done. For Integer and Date fields it is as indicated. For Strings E means exact match, L means like match and G is not available for strings.

5.1.13 Table Name: Attribute_Name Table

Table 13 shows the Attribute_Name Table.

TABLE 13

| S. No. | Field Name | Data Type | Mandatory | Description |
|---|---|---|---|---|
| 1. | Atr_mr_rf_no | INTEGER | Y | Merchant reference no |
| 2. | Atr_field_name | VARCHAR(18) | Y | Opportunity/ Business Profile Table field. |
| 3. | Atr_display_name | VARCHAR(100) | Y | Display Name for the field |
| 4. | Atr_searchable | CHAR(1) | Y | Y: Yes N: No |

Primary Key: Atr_field_name
Constraints: None.
Purpose: To store the names of the attributes defined for the Opportunity and Trader. Profiles. Atr_searchable defines whether the Opportunity field will be searched in the Opportunity Search Form OR whether the profile field is searched in the Profile Search Form.

6. Web Pages

A set of web pages is described hereinafter that are specific to the Trading Network Store 100. The pages used by Net Commerce are the same (for example pages used for Registration, Payment, change in Trader Contact Information etc.).

6.1 Static Web Pages

6.1.1 Create Opportunity Table Page (see FIG. 3)

| | |
|---|---|
| Module | Store Creation Process. |
| From | Step 9 of the Store Creation Process. |
| Links | None. |
| Input | Identifier, Label, Type, Max Length, ToBeSearched. |
| Output | Opportunity Table Creation Script, Partial Attribute_Name Table. Population Script |
| Submit | Next-Create Opportunity Table Page, Finish-Create Business Profile Step 1 Page |

6.1.2 Create Business Profile Table Step 1 Page (see FIG. 4)

| | |
|---|---|
| Module | Store Creation Process. |
| From | Create Opportunity Table Page. |
| Links | None. |
| Input | Identifier, Label, Type, Max Length, ToBeMatched. |
| Output | Business Profile Table Creation Script, Attribute_Name Table Population Script, and MatchRelation Table Population Script. |
| Submit | Next-Create Business Profile Table Step 1 Page, Finish-Create Business Profile Step 2 Page |

6.1.3 Create Business Profile Table Step 2 Page (see FIG. 5)

| | |
|---|---|
| Module | Store Creation Process. |
| From | Create Business Profile Table Step 1 Page. |
| Links | None. |
| Input | No of Keywords, ToBeMatchedwith. |
| Output | Populate Trader KeywordDetails and TraderKeywordMatch Tables. |
| Submit | Finish-Action: Create Store. |

6.1.4 Contact Company Page

| | |
|---|---|
| Module | Trader. |
| From | Profile Details Page, Opportunity Details Page. |
| Links | None. |
| Input | Message to be sent. |
| Output | Mail No T1/Mail No T2. |
| Submit | Send Mail -> Sends the mail to the Profile/Opportunity Owner, Updates the Opp_enq_recd field in the Opportunity Table. |

6.1.5 Create Business Opportunity Page

| | |
|---|---|
| Module | Trader. |
| From | Self-Opportunities Page. |
| Links | Self-Opportunities Page. |
| Input | Business Opportunity Attribute Values. |
| Output | Business Opportunity for the Trader is created. |
| Submit | Create. |

6.1.6 Create Business Profile Page

| | |
|---|---|
| Module | Trader. |
| From | Self-Profiles Page. |
| Links | Self-Profiles Page. |
| Input | Business Profile Attribute Values. |
| Output | Business Profile of the Trader is created. |
| Submit | Create. |

6.1.7 Opportunity Search Page (see FIG. 6)

| | |
|---|---|
| Module | Trader. |
| From | Trader Home Page. |
| Links | Opportunity Search Results Page, Trader Home Page. |
| Input | The Search Criteria. |
| Output | List of Opportunities matching the criteria specified by the user. |
| Submit | Search. |
| Comment | The Text string entered by the user is searched in the opp_title, opp_description and the extra fields specified to be searched by the Store Administrator at the time of Store Creation. |

6.1.8 Profile Search Page (see FIG. 7)

| | |
|---|---|
| Module | Trader. |
| From | Trader Home Page. |
| Links | Profile Search Results Page, Trader Home Page. |
| Input | The Search Criteria. |
| Output | List of Profiles matching the criteria specified by the user. |
| Submit | Search. |
| Comment | The Text string entered by the user is searched in the Profile Keywords and the extra fields specified to be searched by the Store Administrator at the time of Store Creation. |

6.2 Dynamic Web Pages

6.2.1 Trader Home Page

| | |
|---|---|
| Module | Trader. |
| From | Trader Logon Page. |
| Links | Matching Profiles Page, Matching Opportunities Page, Self-Opportunities Page, Self-Profiles Page and Opportunity Report Page. |
| Input | None. |
| Displays | List of Business Profiles for the Trader with number of Matching Profiles and Opportunities listed against each. |
| Output | None. |
| Submit | NA. |

6.2.2 Matching Profiles Page

| | |
|---|---|
| Module | Trader. |
| From | Trader Home Page. |
| Links | Profile Details Page, Trader Home Page. |
| Input | None. |
| Displays | List of Matching Profiles for the Profile of the Trader. (Retrieved from the Profile_Profile Table). |
| Output | None. |
| Submit | NA. |

6.2.3 Profile Details Page

| | |
|---|---|
| Module | Trader. |
| From | Matching Profiles Page. |
| Links | Company Profile Page, Contact Company Page. |
| Input | None. |
| Displays | Details of the Profile matching Traders Profile. (Retrieved from the BusinessProfile Table). |
| Output | None. |
| Submit | NA. |

6.2.4 Matching Opportunities Page

| | |
|---|---|
| Module | Trader. |
| From | Trader Home Page. |
| Links | Trader Home Page, Opportunity Details Page. |
| Input | None. |
| Displays | List of Matching Opportunities for the profile of the Trader. (Retrieved from the Opp_Profile Table). |
| Output | None. |
| Submit | NA. |

6.2.5 Opportunity Details Page

| | |
|---|---|
| Module | Trader. |
| From | Matching Opportunities Page. |
| Links | Company Profile Page, Contact Company Page. |
| Input | None. |
| Displays | Details of the Opportunity matching Traders Profile. (Retrieved from the Opportunity Table). |
| Output | None. |
| Submit | NA. |

6.2.6 Company Profile Page

| | |
|---|---|
| Module | Trader. |
| From | Profile Details Page, Opportunity Details Page. |
| Links | None. |
| Input | None. |
| Displays | Company Information who posted the Profile/Opportunity. |
| Output | None. |
| Submit | NA. |

6.2.7 Self-Profiles Page

| | |
|---|---|
| Module | Trader. |
| From | Trader Home Page. |
| Links | Self-Profile Description Page, Create Business Profile Page. |
| Input | None. |
| Displays | List of the Business profiles of the Trader itself. |
| Output | None. |
| Submit | NA. |

6.2.8 Self-Profile Description Page

| | |
|---|---|
| Module | Trader. |
| From | Self-Profiles Page. |
| Links | Self-Profiles Page, Modify Profile Page. |
| Input | None. |
| Displays | Details of the Business Profile of the Trader itself. |
| Output | None. |
| Submit | Edit –> Modify Profile Page, Delete –> Deletes the Profile of the Trader. |

6.2.9 Modify Profile Page

| Module | Trader. |
|---|---|
| From | Self-Profile Description Page. |
| Links | Self-Profiles Page. |
| Input | Business Profile Details/Attribute Values. |
| Output | Profile of the Trader is modified. |
| Submit | Modify. |

6.2.10 Self-Opportunities Page

| Module | Trader. |
|---|---|
| From | Trader Home Page. |
| Links | Self-Opportunity Description Page, Create Business Opportunity Page. |
| Input | None. |
| Displays | List of the Business Opportunities of the Trader itself. |
| Output | None. |
| Submit | NA. |

6.2.11 Self-Opportunity Description Page

| Module | Trader. |
|---|---|
| From | Self-Opportunities Page. |
| Links | Self-Opportunities Page, Modify Opportunity Page. |
| Input | None. |
| Displays | Details of the Business Opportunity of the Trader itself. |
| Output | None. |
| Submit | Edit −> Modify Opportunity Page, Delete −> Deletes the Opportunity of the Trader. |

6.2.12 Modify Opportunity Page

| Module | Trader. |
|---|---|
| From | Self-Opportunity Description Page. |
| Links | Self-Opportunities Page. |
| Input | Business Opportunity Details/Attribute Values. |
| Output | Opportunity of the Trader is modified. |
| Submit | Modify. |

6.2.13 Opportunity Report Page

| Module | Trader. |
|---|---|
| From | Trader Home Page. |
| Links | Trader Home Page. |
| Input | None. |
| Displays | List of Opportunities posted by the user, date of posting, date of expiry, No of hits on the Opportunity, No of enquiries sent and No of enquiries received in a tabular form. |
| Output | None. |
| Submit | NA. |

6.2.14 Opportunity Search Results Page

| Module | Trader. |
|---|---|
| From | Opportunity Search Page. |
| Links | Opportunity Search Page, Opportunity Details Page and Trader Home Page. |
| Input | None. |
| Displays | List of Opportunities matching the search criteria specified by the user in the previous page. |
| Submit | NA.. |

6.2.15 Profile Search Results Page

| Module | Trader. |
|---|---|
| From | Profile Search Page. |
| Links | Profile Search Page, Profile Details Page and Trader Home Page. |
| Input | None. |
| Displays | List of Profiles matching the search criteria specified by the user in the previous page. |
| Submit | NA. |

7. Daemons in the System

Table 14 lists processes running on the server machine 130.

TABLE 14

| Sl. No. | Name | Executable Name | Frequency | Details |
|---|---|---|---|---|
| 1. | Opportunity Alert Daemon | OpportMatch-Daemon-Background Daemon | Daily | Mails all Traders intimating them about new matching Opportunities posted that day. Updates the Opp_profile Table |
| 2. | Business Profile Alert Daemon | ProfileMatch-Daemon | Daily | Mails all Traders intimating to the Traders about new traders with matching profiles and new traders of prospective traders with matching profile. Updates the Profile_Profile Table |
| 3. | Opportunity Expire Daemon | ExpireOpp-Daemon | Daily | Expires all the Opportunities due to expire. Updates the Opp_Profile Table |
| 4. | Traders Expire Daemon | ExpireTrader-Daemon | Daily | Expires all the Traders due to expire. Updates the Profile_Profile Table |

Each of the daemons listed in Table 13 is described in greater detail hereinafter.

7.1 Opportunity Alert Daemon

The algorithm for this daemon includes the following steps:

1. Total Count=0.
2. Retrieve all active Trader's records from the Shopper Table.
3. Retrieve all Opportunities posted in the last 24 hrs, i.e. posted today if run at 23:45 hrs. Loop through step 4 for each trader.
4. Constitute the e-mail to be sent to this trader. Loop through step 5 for all profiles of this trader
5. Loop through all the opportunities retrieved in step 3 and execute 6.
6. Match the profile with the opportunity. If match found execute step 7 else continue the innermost loop.
7. Count=Count+1, Enter Opp_id, prf_id in the Opp_Profile Table, update opp_enq_sent field in the Opportunity Table.
8. If Total Count>0 Send Email to the trader.

7.2 Business Profile Alert Daemon

The algorithm for this daemon includes the following steps:
1. Total Count=0.
2. Retrieve all active Trader's records from the Shopper Table.
3. Retrieve all profiles posted in the last 24 hrs, i.e. posted today if run at 23:45 hrs. Loop through step 4 for each trader.
4. Constitute the e-mail to be sent to this trader. Loop through step 5 for all profiles of this trader.
5. Loop through all the profiles retrieved in step 3 and execute 6.
6. Match the trader's profile with the profile. If match found execute step 7 else continue the innermost loop.
7. Count=Count+1, Enter prf_id, prf_id in the Profile_Profile Table.
8. If Total Count>0 Send Email to the trader.

7.3 Opportunity Expire Daemon

The algorithm for this daemon includes the following steps:
1. Retrieve from the Opportunity Table all active Opportunity records having expiry dates less than the day before.
2. Delete all records for the Opportunity from the Opp_Profile Table.
3. Delete the Opportunity from the system.

7.4 Traders Expire Daemon

The algorithm for this daemon includes the following steps:
1. Retrieve from the Shopper Table all active Trader's records having an expiry date less than the day before.
2. Delete all records for the trader from the Profile_Profile table and Opp_Profile Table.
3. Delete the trader from the system.

8. Matching Algorithms

8.1 Matching Opportunity with Profiles

This algorithm is used in the Opportunity Alert Daemon, and varies with different users and different shops. The algorithm can be customised by the Store Administrator. In general, the algorithm involves a simple comparison of the attributes defined at the time of creation of the store. For example if the attributes defined are country and size, and the user choses the 'and' operator in the user's profile, the algorithm is:

If (('Country of Opportunity'=='Country of Trader') and ('Size of Product in Opportunity'=='Size required by Trader in profile')) then Match=Yes else Match=No.

8.2 Matching Profiles with Profiles

This algorithm is used in the Trader Profile Alert Daemon, and also varies with different users and different shops. The algorithm can be customised by the Store Administrator. In general, algorithm involves a simple comparison of the attributes defined at the time of creation of the store. For example, if the attributes defined are country and size, and the user chooses the 'and' operator in his profile, the algorithm is:

If (('Country of Profile'=='Country of Trader') and ('Size of Product in Profile'=='Size required by Trader in profile')) then Match=Yes else Match=No.

8.3 Search Algorithm

This algorithm is used in the Search Pages, and varies with different users and different shops. The algorithm is customised by the Store Administrator. In general, the algorithm involves a simple comparison of the attributes defined at the time of creation of the store. For example, if the attributes defined are country and size, and the user choses the 'and' operator in the search page, the algorithm is:

If (('Country of Opportunity'=='Country specified on search page') and ('Size of Product in Opportunity'=='Size specified in the search page')) then pass opportunity to search results.

9. Emails

9.1 Reminder Emails

Figure 9:
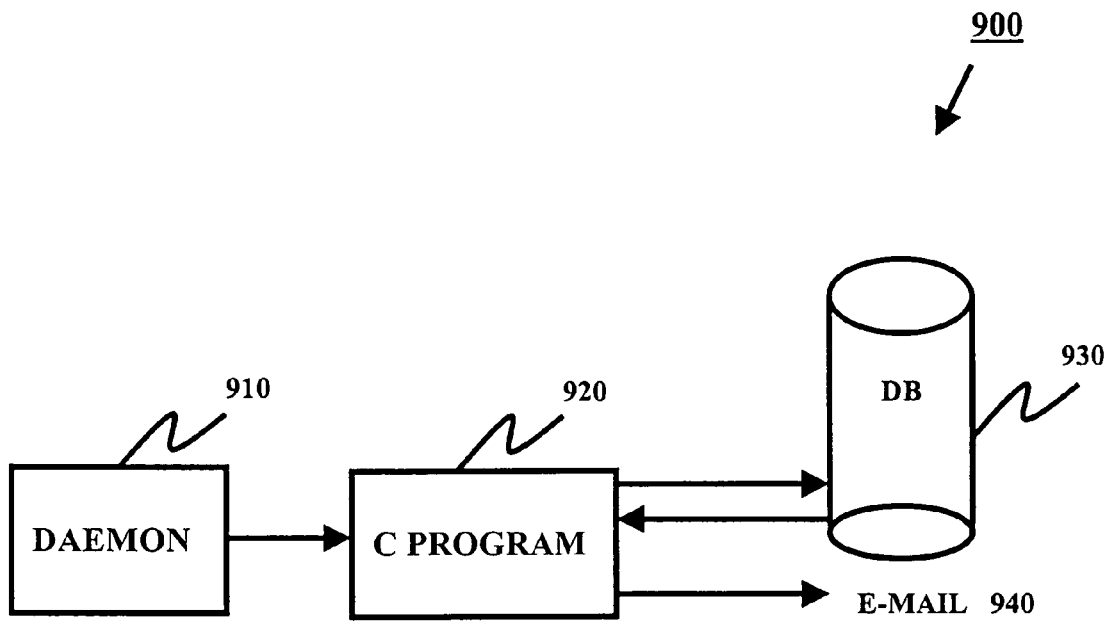
FIG. 9 is a block diagram of a reminder email section in accordance with the embodiments of the invention.

A generalized Block Diagram of the process 900 is shown in FIG. 9. The daemon 910 is coupled to a C program module 920. In turn, the module 920 is coupled bi-directionally with a database 930 and issues e-mail messages 940. The daemon 910 is automatically scheduled to run daily. The daemon runs a C Program 920 that uses Call Level Interface to get the data from the Database 930. The program analyses the data based on the algorithms defined in section 7 and sends an email 940 using any SMTP server in the format defined in section 9 below. Further details of the process 900 are set forth below.

9.1.1 The Daemon

Input:
  None

Output:
  None

Comments:
  This Daemon represents the various daemons being run at the system in the previous section.

9.1.2 Mail No. R1

Table 15 illustrates an email message Mail No. R1.

TABLE 15

| | |
|---|---|
| Mail To: | Trader Profile Owner |
| Mail From: | System |
| Subject: | New Opportunities for you! |
| Body: | Hello, |
| | This is an automatic email from the System. Please do not reply to this mail. |
| | This is to inform you that there are new Opportunities for you in the system. |
| | Business Profile 1: n New Matches |
| | Business Profile 1: m New Matches |
| | Please logon to the site http://www.hostname.com to view the details. |
| | Thank you |
| | Regards |
| Triggered: | This email is sent by the Opportunity Alert Daemon at the end of every day. |

9.1.3 Mail No. R2

Table 16 illustrates an email message Mail No. R2.

TABLE 16

| | |
|---|---|
| Mail To: | Traders |
| Mail From: | System |
| Subject: | New Prospective Contact for you! |
| Body: | Hello, |
| | This is an automatic email from the System. Please do not reply to this mail. |
| | This is to inform you that there are new prospects waiting for you in the system. |

TABLE 16-continued

| | |
|---|---|
| | Business Profile 1: n New Matches |
| | Business Profile 1: m New Matches |
| | Please logon to the site http://www.hostname.com to view the details. |
| | Thank you |
| | Regards |
| Triggered: | This email is sent by the Business Profile Alert Daemon at the end of every day. |

9.2 Triggered E-Mails

These e-mails are triggered by an event.

9.2.1 Mail No. T1

Table 17 illustrates a triggered email message Mail No. T1.

TABLE 17

| | |
|---|---|
| Mail To: | Opportunity Owner |
| Mail From: | System |
| Subject: | Request for More Information! |
| Body: | Hello, |
| | This is an automatic email from the System. Please do not reply to this mail. |
| | This is to inform you that a registered user from the system is interested in trading for you for the Opportunity opp_title. |
| | The following are the details of the User. |
| | Trader Company: |
| | Trader Contact Name: |
| | Trader Company Description: |
| | Trader Contact Address: |
| | Trader Contact Email: |
| | Trader Contact Phone: |
| | Please logon to the site http://www.hostname.com to view the details. |
| | Thank you |
| | Regards |
| Triggered: | This email is triggered when a user views an Opportunity and contacts the Poster of the same. |
| Input: | Email Id of the owner, Details of the User. |
| Procedure: | 1) The program creates a temporary file and writes the contents of the body from the static files and the dynamic information passed to it, to this file. |
| | 2) It then mails this file to the owner. |
| | 3) It deletes the temporary file. |
| Output: | The email T1. |

9.2.2 Mail No. T2

Table 18 illustrates an email message Mail No. T2.

TABLE 18

| | |
|---|---|
| Mail To: | Trader |
| Mail From: | System |
| Subject: | Request for More Information! |
| Body: | Hello, |
| | This is an automatic email from the System. Please do not reply to this mail. |
| | This is to inform you that a registered user from the system is interested in trading for you for your Profile profile_name. |
| | The following are the details of the User. |
| | Trader Company: |
| | Trader Contact Name: |
| | Trader Company Description: |
| | Trader Contact Address: |
| | Trader Contact Email: |
| | Trader Contact Phone: |
| | Please logon to the site http://www.hostname.com to view the details. |
| | Thank you |
| | Regards |

TABLE 18-continued

| | |
|---|---|
| Triggered: | This email is triggered when a user views an Opportunity and contacts the Poster of the same. |
| Input: | Email Id of the owner, Details of the User. |
| Procedure: | 1) The program creates a temporary file and writes the contents of the body from the static files and the dynamic information passed to it, to this file. |
| | 2) It then mails this file to the owner. |
| | 3) It deletes the temporary file. |
| Output: | The email T2. |

10. Case Studies

The following are examples of two particular applications where the Trading Network Store 100 of FIG. 1 is useful.

10.1.1 Chemical Trading Network

Brief Overview

A company ABC Chemicals is a consortium of Chemical Industries (Manufacturers and Traders). ABC Chemicals has many Chemical Industries and Traders as its members. The company has found that with its vast membership, it is difficult to get Buyers and Suppliers in touch with each other manually. The member companies have concerns about this.

A lot of the companies manufacture chemicals which have a short shelf life. Such products become useless over a small time and the company has to bear significant loss as the company is unable to find buyers even though there might be potentially a number of clients looking for the same product.

Some of the member companies buy a lot of chemicals. Even these companies run into a loss on the non-availability of particular product(s) even when there are potentially many sellers available who can supply the product(s).

To solve these problems, ABC Chemicals goes online.

Basic Requirements

Listed below are some basic requirements that ABC Chemicals has:

1. Registration: The member companies are able to register in the system. A Company is able to insert its contact details as well as demographic information. The company can change this profile at any point of time.
2. Business Opportunity Creation: A registered company is able to post an immediate buy/sell requirement on the system. It is able to give details about the products/goods that it is interested in.
3. Search a Business Opportunity: A registered company is able to search for a Business Opportunity by giving certain search criteria. The search criteria can be Product Name, Targeted Geography, Type, and Keyword, Date of Posting, etc. The company is able to view the profile of opportunity as well as the opportunity owner. The company is able to contact the opportunity owner. The contact can be telephone, email, fax, etc.
4. Business Profile Creation/Modification: A registered company is able to create a profile of its interest areas based on which the company receives business opportunities.
5. Opportunity Profile Matchup: A registered company (user) gets a list of all opportunities that match his/her business profile. Again the company is able to view the contact/demographic profile of the opportunity owner and should be able to contact the owner.
6. Payment: ABC Chemicals charges a predetermined one-time fee during registration and accepts any valid international Credit Card.
7. Reports: A company can get a report of its activity at any point of time. The format for the report is provided.

The proposed solution to ABC Chemicals' requirements is a trading network store in accordance with the embodiments of the invention, beginning with first level mapping of the requirements with what is available in the Traders Network. The Site Manager/Store Administrator 122 from ABC Chemicals creates the store and the various forms.

a) The registration forms provided with Net.Commerce can be used to register the member companies. These forms can be customised for any special field required by ABC Chemicals.
b) The store administrator creates the forms for Business Opportunity based on the requirements of ABC Chemicals. This is a one-time procedure as outlined hereinbefore. This form is used by all member companies to create and post Business Opportunities in the system.
c) The search form is automatically created during the store creation. The Store Administrator defines the searchable fields during creation of business opportunity forms. These fields in the opportunity are searched whenever a member company issues a query for searching the opportunity database table.
d) The Store Administrator creates the forms for Business Profile during store creation. This is again a one-time process outlined hereinbefore. This outputs the form for the member companies to create their respective Business Profiles.
e) Business Opportunity/Business Profile matchup is done using the Matching Algorithm.
f) Payment module can be plugged in during the Registration using the current Net Commerce payment mechanisms.
g) Reports can be generated by querying the database using Net.Data macros.

The opportunity owner contact/demographic profiles can be displayed along with the Business Opportunity. This enables the member companies to decide if the companies want to contact the owner and have a prospective business with the companies.

Apart from the above, the member companies also get personalised services like Automatic Alerts for Matching Business Opportunities and Matching Business Profiles, which enables the companies to find potential Business Partners.

10.1.2 Career House Network

Background

Career House Ltd is a company dealing in career-related domain. People often come to Career House in search of jobs. People also ask Career House for information about companies that work in their related domains. People also ask Career House for new seminars or conferences going on in their area of work. Companies HR executives come to Career House to get suitable candidates for their organisation and also approach Career House for participants for seminars the companies hold, training sessions that is conducted, etc.

Requirements

Career House Ltd wants to web enable its business.

1. Individuals should be able to register with Career House with a one-time fee for a period of 6 months.
2. An individual should be able to post their CV on Career House's site and specify the type of job the person is looking for and be automatically informed when there is a prospective job for the person.
3. Individuals should also be able to specify what seminars/conferences and training sessions the individuals are interested in.
4. Companies should be able to register with Career House with a one-time fee for a period of 1 year.
5. Registered companies should be able to post their requirements for employees whenever need arises.
6. Registered companies should get automatic matches of candidates.
7. Registered companies should be able to view these resumes on the site and short-list the same.
8. Registered companies can announce trainings, conferences, and seminars and invite.
9. Companies and Traders should be able to search the Career House Database for information. Companies should be able to search for skills and Individuals should be able to search for prospective jobs and for conferences, trainings and seminars going on/announced.

Implementation/Proposed Solution Using Trading Network Store

The first step is to map the requirements with the model proposed by the Trading Network Store. Career House wants to map Resumes with Job Requirements and send announcements of Conferences/Seminars/Trainings to desired persons to attend these Conferences/Seminars/Trainings. The two entities in this store would be Individuals and Companies.

1. Companies:—
   Announce Trainings,
   Announce Seminars,
   Announce Conferences, and
   Look for people in their domain of work.

2. Individuals:—
   Want to attend Trainings in their domain of work,
   Want to attend Conferences in their domain of work,
   Want to participate in Seminars in their domain of work, and
   Look for Jobs.

There are consequently two Trader Roles—Seek, Offer. There are two types of Traders—Companies and Individuals. Finally, there are four categories—Seminars, Conferences, Trainings and Jobs.

The Registration process is the same. The Payment Module can be added after the Registration. The Store Creator can do a small customisation by adding a new radio button on the Registration form and storing whether the person registering is a Company or an Individual. This information can be stored in one of the extra fields of the Shopper Table.

Individuals register with the System and set up their Profile. In their Profile the individuals describe what type of seminars, conferences or trainings the individuals are interested in. The individuals can post an Opportunity that matches their CV. Similarly Companies register with the System and set up their Profile. The companies describe what type of people the companies are looking for. In a typical scenario, companies can modify their profile based on the project requirements the companies may have. However, their domain of work being constant, major profiles remain the same. The companies also post Opportunities whenever the companies hold conferences, seminars, or trainings.

The Post Opportunity Form and Trader Profile form can be customised to show only the relevant categories to Individuals/Companies with a simple % IF statement in the Net Data macro. (Individuals are shown Trainings, Seminars and Conferences in their Business Profile and only Jobs while posting Opportunities. Companies are shown Trainings, Seminars and Conferences while posting Opportunities and only Jobs for Business Profile).

11. Computer Implementation

The embodiments of the invention are preferably implemented using a general-purpose computer. In particular, the processing or functionality of FIGS. 1–7 and 9 can be implemented as software, or a computer program, executing on the computer. The method or process steps for trading goods or services or both using an electronic network are effected by instructions in the software that are carried out by the computer. The software may be implemented as one or more modules for implementing the process steps. A module is a part of a computer program that usually performs a particular function or related functions. Also, as described hereinbefore, a module can also be a packaged functional hardware unit for use with other components or modules.

In particular, the software may be stored in a computer readable medium, including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects advantageous apparatuses for trading goods or services or both using an electronic network.

Figure 8:
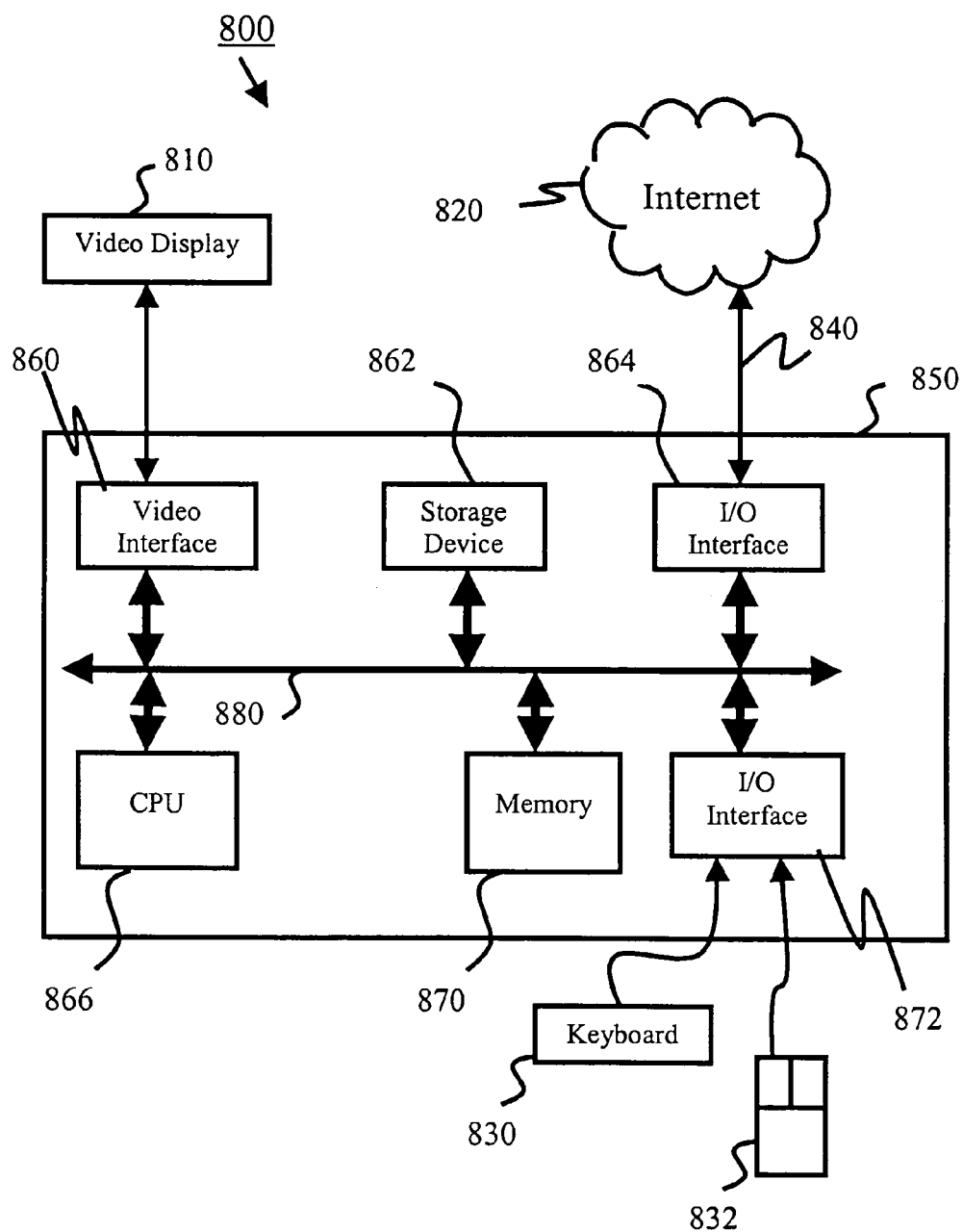
FIG. 8 is a block diagram of a General Purpose Computer, with which the embodiments of the invention can be implemented.

Preferably, a computer system 800 shown in FIG. 8 consists of the computer 850, a video display 810, and input devices 830, 832. In addition, the computer system 800 can have any of a number of other output devices including line printers, laser printers, plotters, and other reproduction devices connected to the computer 850. The computer system 800 can be connected to one or more other computers via a communication interface using an appropriate communication channel 840 such as a modem communications path, a computer network, or the like. The computer network 820 may include a local area network (LAN), a wide area network (WAN), an Intranet, and/or the Internet.

The computer 850 itself consists of a central processing unit(s) 866 (simply referred to as a processor hereinafter), a memory 870 which may include random access memory (RAM) and read-only memory (ROM), input/output (IO) interfaces 864, 872, a video interface 860, and one or more storage devices 862. The storage device(s) 862 can consist of one or more of the following: a floppy disc, a hard disc drive, a magneto-optical disc drive, CD-ROM, magnetic tape or any other of a number of non-volatile storage devices well known to those skilled in the art. Each of the components is typically connected to one or more of the other devices via a bus 880 that in turn can consist of data, address, and control buses.

The video interface 860 is connected to the video display 810 and provides video signals from the computer for display on the video display 810. User input to operate the computer can be provided by one or more input devices 830, 832. For example, an operator can use a keyboard 830 and/or a pointing device such as the mouse 832 to provide input to the computer.

The foregoing system is simply provided for illustrative purposes and other configurations can be employed without departing from the scope and spirit of the invention. Computers with which the embodiment can be practiced include IBM-PC/ATs or compatibles, one of the Macintosh™ family of PCs, Sun Sparcstation™, a workstation or the like. The foregoing are merely examples of the types of computers with which the embodiments of the invention may be practiced. Typically, the processes of the embodiments, are resident as software or a program recorded on a hard disk drive as the computer readable medium, and read and controlled using the processor. Intermediate storage of the program and intermediate data and any data fetched from the network may be accomplished using the semiconductor memory, possibly in concert with the hard disk drive.

In some instances, the program may be supplied to the user encoded on a CD-ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a radio or infra-red transmission channel between the computer and another device, a computer readable card such as a PCMCIA card, and the Internet 820 and Intranets including email transmissions and information recorded on websites and the like. The foregoing are merely examples of relevant computer readable mediums. Other computer readable mediums may be practiced without departing from the scope and spirit of the invention.

In the foregoing manner, a method, an apparatus, and a computer program product for trading goods, or services, or both, using an electronic network are disclosed. While only a small number of embodiments are described, it will be apparent to those skilled in the art in view of this disclosure that numerous changes and/or modifications can be made without departing from the scope and spirit of the invention.

We claim:

1. A method of trading goods, or services, or both, using a computerized trading system coupled to an electronic network, said method including the steps of:

registering two or more business entities as traders;

generating at least one business profile for each of said traders, wherein the traders include buyers and sellers and the respective profiles for traders that are buyers identify them as buyers and the respective profiles for traders that are sellers identify them as sellers;

generating business opportunities for ones of said traders, wherein such business opportunities include i) selling opportunities, in which respective buyers define immediate requirements to buy, and ii) buying opportunities, in which respective sellers define immediate requirements to sell;

comparing, automatically by the trading system, the business opportunities for respective ones of the traders to the profiles of other ones of the traders;

comparing, automatically by the trading system, the one or more profiles for respective ones of the traders to the one or more profiles of other ones of the traders;

notifying such a buyer about one of the buying opportunities, by the trading system automatically via said electronic network, responsive to the profile of the buyer matching the buying opportunity;

notifying such a seller about one of the selling opportunities, by the trading system automatically via said electronic network, responsive to the profile of the seller matching the selling opportunity;

notifying such a buyer about a selected one of the profiles, by the trading system automatically via said electronic network, responsive to the profile of the buyer matching the selected profile; and notifying such a seller about a selected one of the profiles, by the trading system automatically via said electronic network, responsive to the profile of the seller matching the selected profile.

2. The method according to claim 1, wherein each business entity is selected from the group consisting of a natural person, a legal entity and a business.

3. The method according to claim 1, wherein said notifying steps includes the step of sending an email message to each of said one or more remaining traders having matching profiles.

4. The method according to claim 1, further including the step of creating a trading shop communicable with each of said traders via said electronic network, said trading shop being a repository of said business profiles and said at least one business opportunity.

5. The method according to claim 4, wherein said creating step includes the steps of:
specifying attributes of a business profile for said trading shop;
specifying attributes of a business opportunity for said trading shop; and
creating tables with said specified attributes.

6. The method according to claim 5, wherein said creating step includes the step of customising workflow of said trading shop.

7. The method according to claim 1, wherein trading includes:
buying goods, a service, or both; and
selling goods, a service, or both.

8. The method according to claim 1, further including the step of requesting payment from said trader during registration of said trader, creation of a business profile for said trader, or posting of a business opportunity by said trader.

9. The method according to claim 1, further including the step of searching by one of said traders for at least one business opportunity or at least one profile matching a specified business profile.

10. The method according to claim 1, further including the step of providing a database containing said at least one business opportunity and said business profiles.

11. The method according to claim 1, wherein a business profile specifies information about a trader and contains a plurality of attributes for storing information pertinent to a trader.

12. The method according to claim 1, wherein said business opportunities include attributes for storing information pertinent to said opportunity.

13. An apparatus for trading goods, or services, or both, using a computerized trading system coupled to an electronic network, said apparatus including:
means for registering two or more business entities as traders;
means for generating at least one business profile for each of said traders, wherein the traders include buyers and sellers and the respective profiles for traders that are buyers identify them as buyers and the respective profiles for traders that are sellers identify them as sellers;
means for generating business opportunities for ones of said traders, wherein such business opportunities include i) selling opportunities, in which respective buyers define immediate requirements to buy, and ii) buying opportunities, in which respective sellers define immediate requirements to sell;
means for comparing, automatically by the trading system, the business opportunities for respective ones of the traders to the profiles of other ones of the traders;
means for comparing, automatically by the trading system, the one or more profiles for respective ones of the traders to the one or more profiles of other ones of the traders;
means for notifying such a buyer about one of the buying opportunities, by the trading system automatically via said electronic network, responsive to the profile of the buyer matching the buying opportunity;
means for notifying such a seller about one of the selling opportunities, by the trading system automatically via said electronic network, responsive to the profile of the seller matching the selling opportunity;
means for notifying such a buyer about a selected one of the profiles, by the trading system automatically via said electronic network, responsive to the profile of the buyer matching the selected profile; and
means for notifying such a seller about a selected one of the profiles, by the trading system automatically via said electronic network, responsive to the profile of the seller matching the selected profile.

14. The apparatus according to claim 13, wherein each business entity is selected from the group consisting of a natural person, a legal entity and a business.

15. The apparatus according to claim 13, wherein said notifying means include means for sending an email message to each of said one or more remaining traders having matching profiles.

16. The apparatus according to claim 13, further including means for creating a trading shop communicable with each of said traders via said electronic network, said trading shop being a repository of said business profiles and said at least one business opportunity.

17. The apparatus according to claim 16, wherein said creating means includes:
means for specifying attributes of a business profile for said trading shop;
means for specifying attributes of a business opportunity for said trading shop; and
means for creating tables with said specified attributes.

18. The apparatus according to claim 16, wherein said creating means includes means for customising workflow of said trading shop.

19. The apparatus according to claim 13, wherein trading includes:
buying goods, a service, or both; and
selling goods, a service, or both.

20. The apparatus according to claim 13, further including means for requesting payment from said trader during registration of said trader, creation of a business profile for said trader, or posting of a business opportunity by said trader.

21. The apparatus according to claim 13, further including means for searching by one of said traders for at least one business opportunity or at least one profile matching a specified business profile.

22. The apparatus according to claim 13, further including means for providing a database containing said at least one business opportunity and said business profiles.

23. The apparatus according to claim 13, wherein a business profile specifies information about a trader and contains a plurality of attributes for storing information pertinent to a trader.

24. The apparatus according to claim 13, wherein said business opportunities include attributes for storing information pertinent to said opportunity.

25. A computer program product having a computer readable medium having a computer program recorded therein for trading goods, or services, or both, using a computerized trading system coupled to an electronic network, said computer program product including:
- computer program code means for registering two or more business entities as traders;
- computer program code means for generating at least one business profile for each of said traders, wherein the traders include buyers and sellers and the respective profiles for traders that are buyers identify them as sellers;
- computer program code means for generating business opportunities for ones of said traders, wherein such business opportunities include i) selling opportunities, in which respective buyers define immediate requirements to buy, and ii) buying opportunities, in which respective sellers define immediate requirements to sell;
- computer program code means for comparing said at least one business opportunity or said at least one business profile of said one trader with said business profiles of said remaining traders; and
- computer program code means for notifying via said electronic network one or more of said remaining traders of a trading opportunity if said at least one business opportunity or said at least one profile matches said at least one business profile corresponding to one or more of said remaining traders;
- computer program code means for comparing, automatically by a trading system, the business opportunities for respective ones of the traders to the profiles of other ones of the traders;
- computer program code means for comparing, automatically by the trading system, the one or more profiles for respective ones of the traders to the one or more profiles of other ones of the traders;
- computer program code means for notifying such a buyer about one of the buying opportunities, by the trading system automatically via said electronic network, responsive to the profile of the buyer matching the buying opportunity;
- computer program code means for notifying such a seller about one of the selling opportunities, by the trading system automatically via said electronic network, responsive to the profile of the seller matching the selling opportunity;
- computer program code means for notifying such a buyer about a selected one of the profiles, by the trading system automatically via said electronic network, responsive to the profile of the buyer matching the selected profile; and
- computer program code means for notifying such a seller about a selected one of the profiles, by the trading system automatically via said electronic network, responsive to the profile of the seller matching the selected profile.

26. The computer program product according to claim 25, wherein each business entity is selected from the group consisting of a natural person, a legal entity and a business.

27. The computer program product according to claim 25, wherein said computer program code means for notifying includes computer program code means for sending an email message to each of said one or more remaining traders having matching profiles.

28. The computer program product according to claim 25, further including computer program code means for creating a trading shop communicable with each of said traders via said electronic network, said trading shop being a repository of said business profiles and said at least one business opportunity.

29. The computer program product according to claim 28, wherein said computer program code means for creating includes:
- computer program code means for specifying attributes of a business profile for said trading shop;
- computer program code means for specifying attributes of a business opportunity for said trading shop; and
- computer program code means for creating tables with said specified attributes.

30. The computer program product according to claim 28 wherein said computer program code means for creating includes computer program code means for customising workflow of said trading shop.

31. The computer program product according to claim 25, wherein trading includes:
- buying goods, a service, or both; and
- selling goods, a service, or both.

32. The computer program product according to claim 25, further including computer program code means for requesting payment from said trader during registration of said trader, creation of a business profile for said trader, or posting of a business opportunity by said trader.

33. The computer program product according to claim 25, further including computer program code means for searching by one of said traders for at least one business opportunity or at least one profile matching a specified business profile.

34. The computer program product according to claim 25, further including computer program code means for providing a database containing said at least one business opportunity and said business profiles.

35. The computer program product according to claim 25, wherein a business profile specifies information about a trader and contains a plurality of attributes for storing information pertinent to a trader.

36. The computer program product according to claim 25, wherein said business opportunities include attributes for storing information pertinent to said opportunity.

* * * * *